C. W. RIGERMAN.
INK WELL.
APPLICATION FILED FEB. 2, 1918.
1,278,016.
Patented Sept. 3, 1918.
2 SHEETS—SHEET 1.
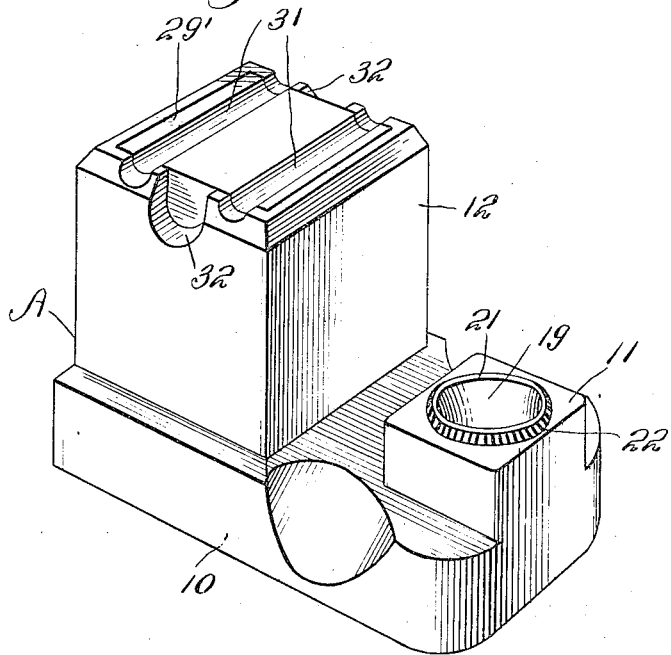
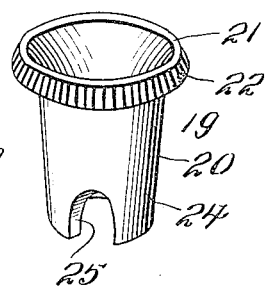
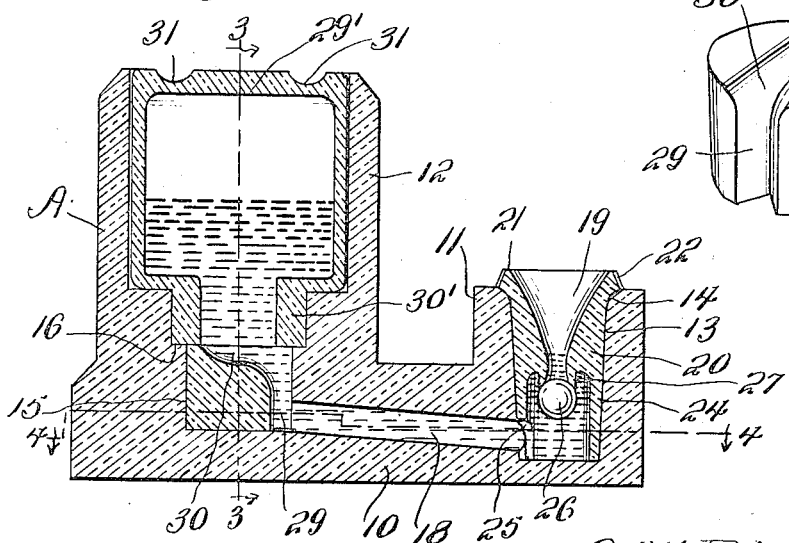
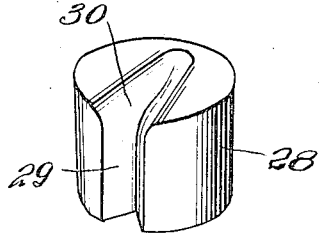
Witnesses
Inventor
C. W. Rigerman
By Victor J. Evans
Attorney C. W. RIGERMAN.
INK WELL.
APPLICATION FILED FEB. 2, 1918.
1,278,016.
Patented Sept. 3, 1918.
2 SHEETS—SHEET 2.
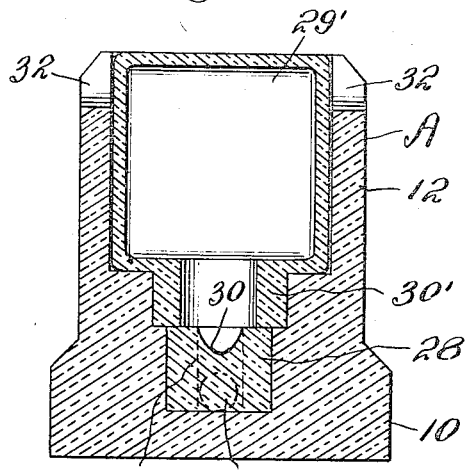
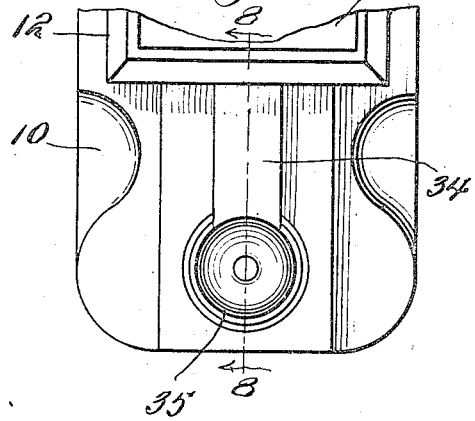
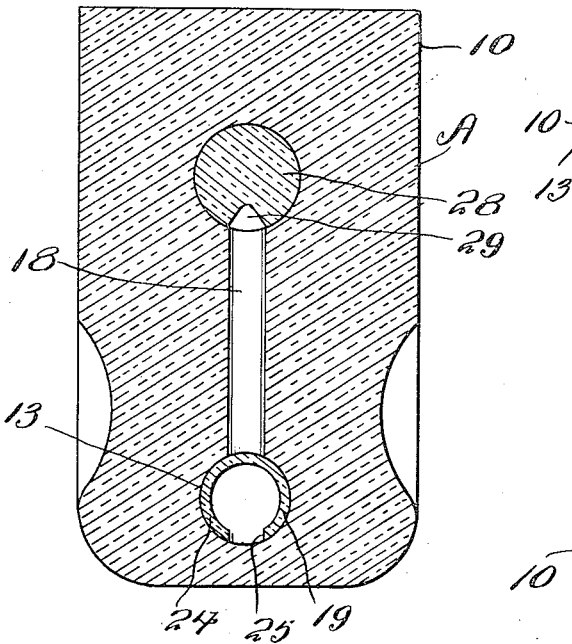
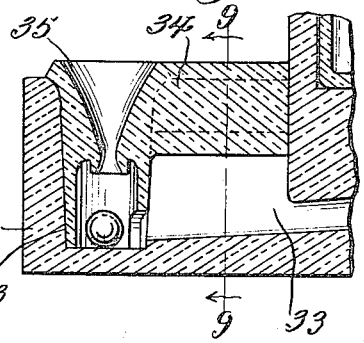
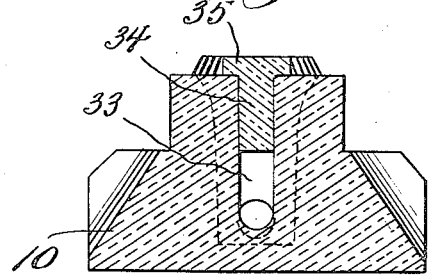
INVENTOR
C. W. Rigerman
BY Victor J. Evans
ATTORNEY
WITNESSES

UNITED STATES PATENT OFFICE.

CLARENCE W. RIGERMAN, OF LOCKPORT, NEW YORK.

INK-WELL.

1,278,016.

Specification of Letters Patent.  Patented Sept. 3, 1918.

Application filed February 2, 1918. Serial No. 215,120.

*To all whom it may concern:*

Be it known that I, CLARENCE W. RIGERMAN, a citizen of the United States, residing at Lockport, in the county of Niagara and State of New York, have invented new and useful Improvements in Ink-Wells, of which the following is a specification.

This invention relates to an ink well and particularly to an ink well of the self-feeding type.

The primary object of the invention is to provide an inexpensive and attractive ink well of this character having associated therewith a source of ink supply from which ink is fed to the pen receiving portion of the well and prevented from rising above the predetermined height therein.

An object of the invention is to provide an ink well of this character which is provided with a valve of novel construction which not only controls the height to which the ink may rise in the pen receiving portion of the well, but may be employed if desired to cut off communication between the source of ink supply and the pen receiving portion of the well.

A further object of the invention is to provide an ink well of this character wherein a valve which serves as the pen receiving portion of the ink well is so constructed that it may be employed to obstruct an ink passage in the base of the ink well when the occasion requires.

A still further object of the invention is to provide a valve which may be employed as the pen receiving portion of the well which has formed therein a channel which is so shaped as to prevent a pen being forced sufficiently far into the well to cause injury to the point.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications within the scope of the claims may be resorted to when desired.

In the drawings:—

Figure 1 is a perspective view of an ink well constructed in accordance with the invention.

Fig. 2 is a longitudinal section therethrough.

Fig. 3 is a vertical transverse section on the line 3—3 of Fig. 2.

Fig. 4 is a horizontal section on the line 4—4 of Fig. 2 of the valve which serves as a pen receiving portion of the well and is shown in position to obstruct the ink passage of the base.

Fig. 5 is a detail perspective view of the valve which serves as a pen receiving portion of the ink well.

Fig. 6 is a similar view of the valve which may be employed to control the communication between the supply of ink from the receptacle or reservoir.

Fig. 7 is a top plan view of a portion of the ink well showing a slight modification of the invention.

Fig. 8 is a section on the line 8—8 of Fig. 7.

Fig. 9 is a vertical transverse section on the line 9—9 of Fig. 8.

Like characters of reference denote corresponding parts throughout the several views in the drawings.

Referring now to the drawings in detail and more particularly to Figs. 1 to 6, the letter A designates an ink well constructed in accordance with the invention and which may be formed of any material suitable for the purpose, such as glass or the like.

The ink well A includes a substantially rectangular shaped base 10 which has formed integral therewith adjacent one end a boss 11 and adjacent its other end an open top casing 12. Formed in the base 10 is a valve chamber 13 which opens out through the top of the boss 11 and is flared at its upper end to provide a valve seat 14. A second valve chamber 15 is formed in the base 10 and opens out into the casing 12, said valve chamber 15 is enlarged adjacent its upper end to form a seat as shown at 16. An inclined ink passage 18 formed in the base 10 establishes communication between the valve chambers 13 and 15.

A valve 19 which serves as the pen receiving portion of the ink well A includes a valve casing 20 which comprises a flared head 21 which rests upon the valve seat 14 and has formed thereon a knurled flange 22 to facilitate the turning of the valve casing within the valve chamber 13 for a purpose which will hereinafter appear. Formed integral with the head 21 is a hollow cylindrical stem 24 which snugly fits within the cylindrical portion of the valve chamber 13 and is coextensive in length therewith. The stem 24 has formed therein at its lower end a recess 25 which when brought into alinement with the ink passage 18 allows the ink within said passage to enter the valve casing 20. A float valve 26 which in this instance has been shown as a ball is arranged within the stem 24 and is adapted to be held by the ink in the valve casing against a valve seat 27 in the stem 24, so that the ink will not rise too high in the channel in the valve 19 when the ink well is placed on a sloping surface. The passage in the stem 24 gradually decreases in diameter from the head 21 toward the valve seat 27 to prevent a pen being forced sufficiently far within the passage to cause injury to the point of the pen.

A valve 28 of cylindrical shape fits snugly within the valve chamber 15 below the seat 16 and has formed in the periphery thereof a longitudinally extending channel 29 which opens out at its upper end into a recess 30 in the top of the valve 28.

An ink reservoir for supplying ink to the pen receiving portion of the base A comprises a receptacle 29' which is arranged within the casing 12 to rest upon the bottom of the casing and is provided with a neck 30' which rests upon the seat 16. The flow of ink from the receptacle 29' to the pen receiving portion of the well A may be controlled by turning the valve 28 within the chamber 15 and if desired the valve 28 may be turned to a position within the chamber 15 wherein the channel 29 will be out of registration with the ink passage 18, thereby obstructing the passage of ink through said channel.

The height to which the ink will rise in the valve 19 is controlled by the length of the valve 28 and by increasing or decreasing the length of this valve the height to which the ink will rise in the valve 19 may be correspondingly varied.

The top of the receptacle 29' has formed therein transversely extending grooves 31 in which may be arranged a writing instrument such as a pen, while the casing 12 has the walls thereof recessed, as at 32 to facilitate the removal of the receptacle 29'.

When it is desired to fill the ink well with ink the receptacle 29' is withdrawn from the casing 12 and filled with ink. The base 10 is now inverted and the receptacle 29' inserted in the casing 12, after which the base 10 is restored to its normal position. With the base 10 in its normal position the ink in the receptacle 29' will pass through the channel in the valve 28 and through the ink passage 18 and into the valve casing 20. As the ink rises in the casing 20 the valve 26 will be forced thereby into engagement with the seat 27 and the ink prevented from rising above a point in the casing 20 which is in line with the bottom of the receptacle 29'.

When it is desired to interrupt the flow of ink from the source of ink supply to the casing 20 the casing is turned in the valve chamber 13 to move the recess 25 out of alinement with the ink passage 18.

Referring now to Figs. 7 to 9 in the drawings wherein there has been shown a slight modification of the invention it will be noted that the base 10 and casing 12 are identical in construction with these portions of the well shown in the preferred form of the invention with the exception that a channel 33 which corresponds to the channel 18 opens out through the top of the base 10 in advance of the casing 12. To provide a cover for the portion of the channel 33 which opens out through the top of the base 10, I provide an extension 34 on a valve 35 which is otherwise identical in construction with the valve 19 and is arranged in a valve chamber 13 in the base 10.

By constructing the base of the ink well and the valve 35 as shown in the modified form of the invention access may be readily had to the channel 33 for the cleaning thereof and also its ink holder capacity materially increased.

From the foregoing description taken in connection with the accompanying drawings it is apparent that an efficient inexpensive and attractive ink stand has been provided.

Having thus described the invention, what is claimed as new is:—

1. The combination with an ink well including a base, a reservoir therein, a valve chamber communicating with said reservoir through a passage, of a valve comprising a substantially cylindrical body having a pen receiving opening therein and mounted for rotation in said base, a relatively large valve chamber also formed in said cylindrical body and communicating with the pen receiving opening, the said valve chamber having an opening in the wall thereof for establishing communication with the reservoir through the passage and a valve located within the valve chamber of the first mentioned valve for normally closing the pen receiving opening.

2. The combination with an ink well including a base a reservoir therein and a valve chamber communicating with said reservoir through a passage, of a valve comprising a substantially cylindrical body having a pen receiving opening therein and mounted for rotation in said base, a relatively large valve chamber also formed in said cylindrical body and communicating with the pen receiving opening, the said valve chamber having an opening in the wall thereof for establishing communication with the reservoir through the passage, a valve seat formed at the juncture of the pen receiving opening and the valve chamber and a float valve located within the said chamber for engagement with said seat to normally close the pen receiving opening.

3. The combination with an ink well including a base, a reservoir therein and a valve chamber communicating with said reservoir through a passage, of a valve comprising a substantially cylindrical body having a pen receiving opening therein and mounted for rotation in said base, a relatively large valve chamber also formed in said cylindrical body and communicating with the pen receiving opening, the said valve chamber having an opening in the wall thereof for establishing communication with the reservoir through the passage, a valve seat formed at the juncture of the pen receiving opening and the valve chamber and a ball valve freely movable in said chamber for engagement with said seat to normally close the pen receiving opening.

In testimony whereof I affix my signature.

CLARENCE W. RIGERMAN.